United States Patent [19]

Manzoni

[11] Patent Number: 4,475,414
[45] Date of Patent: Oct. 9, 1984

[54] REMOTE-CONTROL DEVICE FOR VEHICLE REARVIEW MIRROR

[76] Inventor: Stéphane Manzoni, 1, rue Pasteur, Saint Claude, France, 39200

[21] Appl. No.: 413,040

[22] Filed: Aug. 30, 1982

[30] Foreign Application Priority Data

Sep. 11, 1981 [FR] France .................................. 81 17246

[51] Int. Cl.$^3$ ........................... F16C 1/10; G05G 9/04
[52] U.S. Cl. ............................. 74/501 M; 74/471 XY; 350/289
[58] Field of Search ..................... 74/501 M, 471 XY; 350/289

[56] References Cited

U.S. PATENT DOCUMENTS

| | | | |
|---|---|---|---|
| 3,057,262 | 10/1962 | Jacobson | 74/501 M |
| 3,370,479 | 2/1968 | Van Noord | 74/501 M |
| 3,612,666 | 10/1971 | Rabinow | 250/289 |
| 4,306,465 | 12/1981 | Manzoni | 74/501 M |
| 4,388,840 | 6/1983 | Manzoni | 74/501 M |

FOREIGN PATENT DOCUMENTS

| | | | |
|---|---|---|---|
| 19501 | 11/1980 | European Pat. Off. | 74/501 M |
| 1376313 | 12/1963 | France | 74/471 XY |
| 2311690 | 1/1977 | France | 64/501 M |
| 323811 | 9/1957 | Switzerland | 350/289 |

*Primary Examiner*—Lawrence J. Staab
*Assistant Examiner*—Anthony W. Raskob, Jr.
*Attorney, Agent, or Firm*—Remy J. VanOphem

[57] ABSTRACT

A remote control apparatus for a vehicle rearview mirror including a control device disposed inside the vehicle and connected, by way of two transmission cables, to a mirror actuating device disposed inside the rearview mirror housing, on the exterior of the vehicle. The control device has a support member in which two transmission members are mounted for sliding in parallel and a control member pivotally and rotatably mounted to the support member. Each of the transmission members are connected to a transmission cable. One of the transmission members has a slot located in a place perpendicular to its sliding axis, in which slot is engaged one end of the control lever. The other of the transmission members has a slot inclined relative to the plane perpendicular to the sliding axis. A pin extends from the control member in a direction perpendicular to the one end thereof and engages the slot in the other transmission member. The actuating device includes a mirror housing, a crosspiece pivotally mounted to the mirror housing, a mirror pivotally mounted to the crosspiece, and the free end of one of the transmission cables interconnected with the crosspiece such as to pivot the mirror in one coordinate direction. The actuation device also includes a lever pivotally interconnected with the mirror housing, hingedly interconnected with the mirror, and fixedly interconnected with the free end of the other transmission cable to pivot the mirror in the other coordinate direction.

19 Claims, 10 Drawing Figures

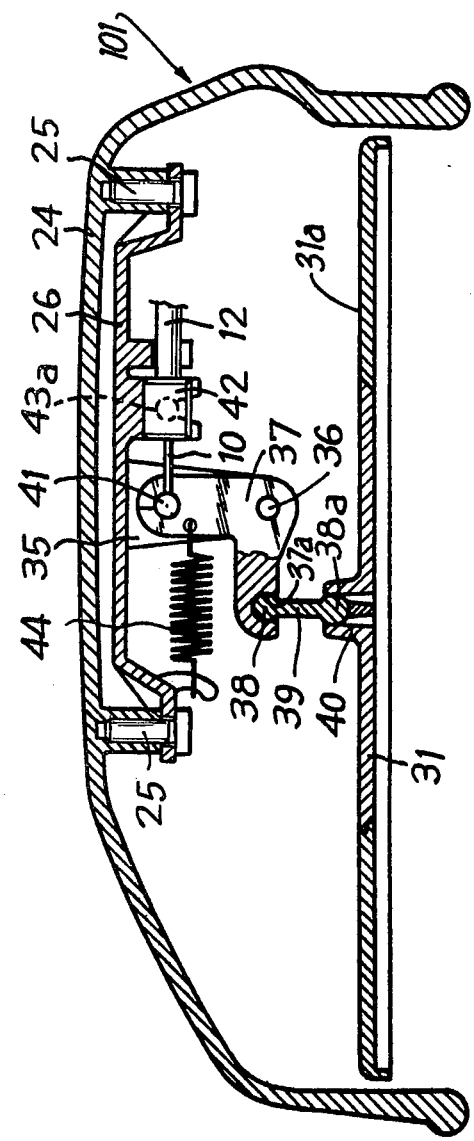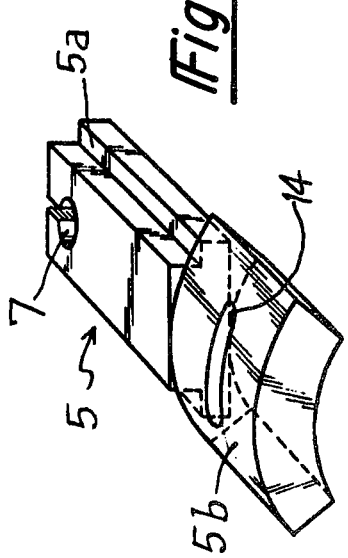

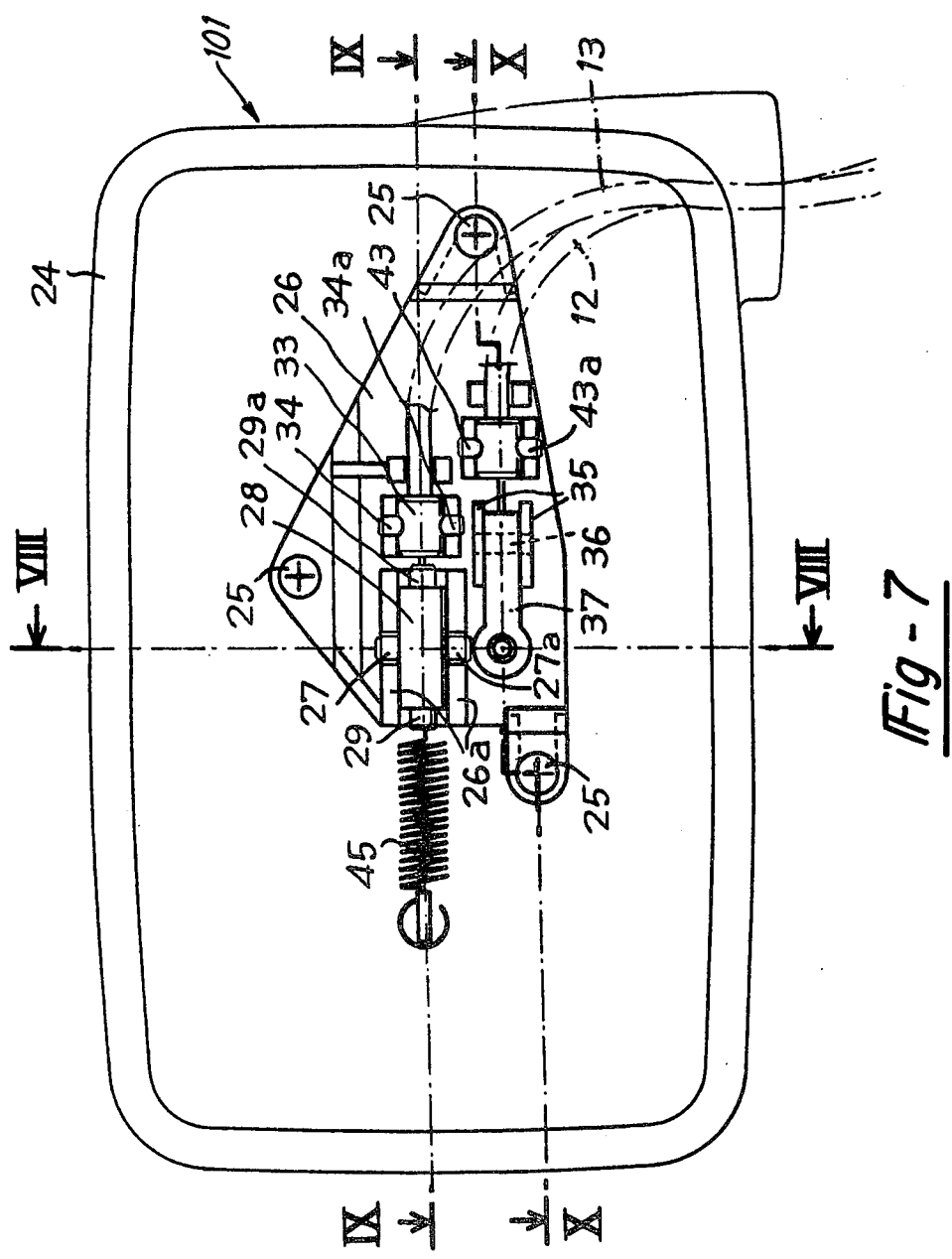

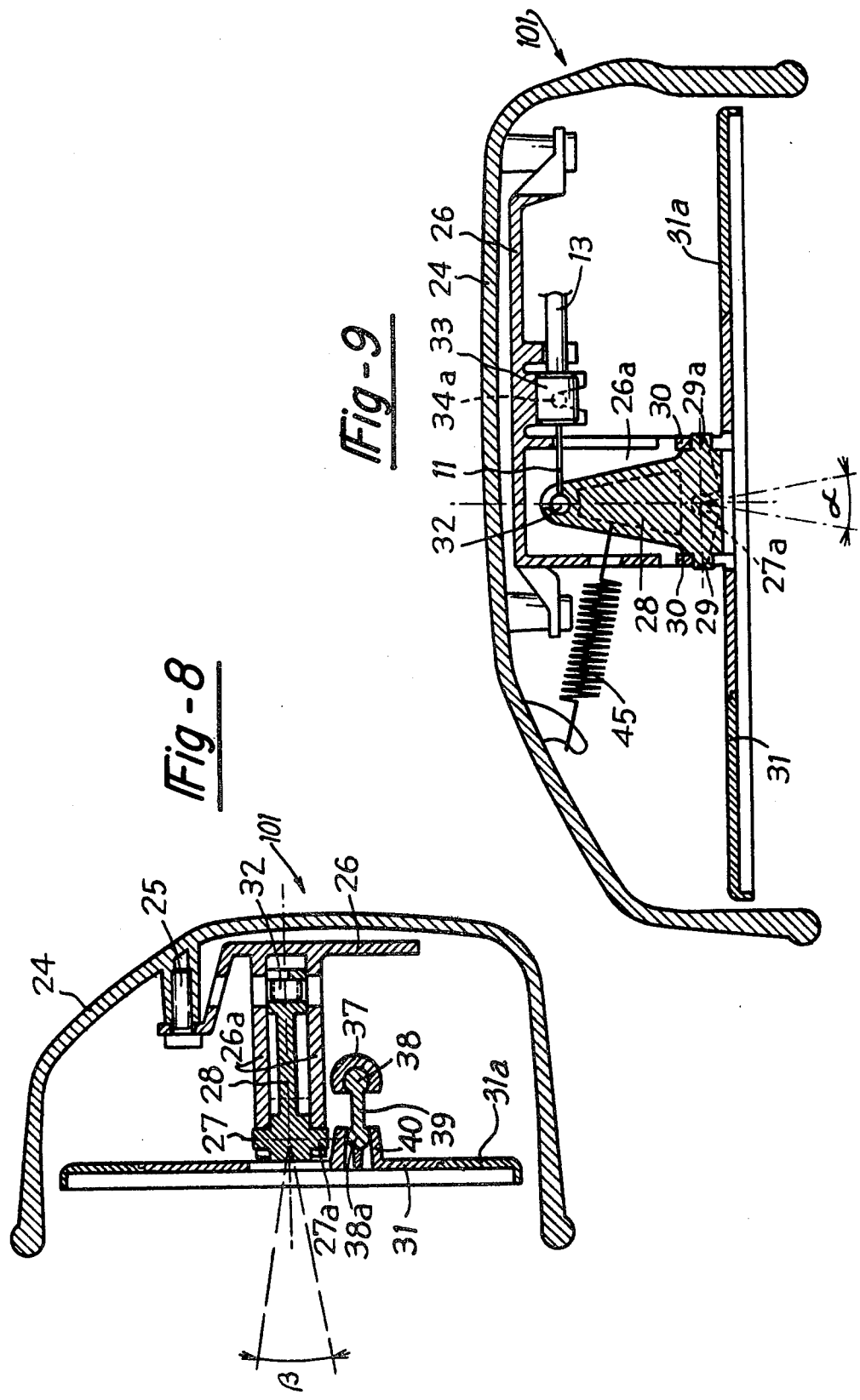

REMOTE-CONTROL DEVICE FOR VEHICLE REARVIEW MIRROR

The present invention relates to a remote-control device for a vehicle rearview mirror.

Certain motor vehicles, and in particular luxury vehicles, are designed to be equipped on the passenger side with a rearview mirror controlled by an electric motor. Prior to the present invention, these mechanisms have been too expensive to be fitted on less expensive, or standard vehicles.

Moreover, the mechanical control devices previously known, which use three transmission cables, do not accurately transmit the movement to the mirror, due to excessive length of the transmission members.

SUMMARY OF THE PRESENT INVENTION

It is the object of the present invention to provide an improved remote control device for a vehicle rearview mirror. In particular it is the object of the present invention to provide a remote control device having a control member situated inside the vehicle and connected, via two transmission cables, to means for actuating the mirror situated inside the rearview mirror housing, which is mounted to the exterior of the vehicle.

According to the present invention, the rearview mirror housing is provided with a support member on which a crosspiece is mounted for pivoting about a vertical axis. The crosspiece is equipped with a mirror support mounted for pivoting about a horizontal axis, and is pivotally mounted to one end of one of the transmission cables the support is a pivot on which an elbow-shaped lever is pivotally mounted at its center. One end of which lever is connected to one of the transmission cables. The other end thereof is connected to the mirror support, by way of a hinged finger, at a point which is offset with respect to the horizontal pivoting axis of the mirror support on the crosspiece.

The remote control device according to the invention uses control means and actuating means having simple kinematic characteristics, in order to allow a reliable and accurate control of the mirror at a reasonable cost. The device can be used for the passenger-side rearview mirror, on the left or right side of a motor vehicle.

BRIEF DESCRIPTION OF THE DRAWING

The present invention will be more readily understood on reading the following description with reference to the accompanying drawings in which:

FIG. 6 is a perspective view of one of the sliding actuating members;

FIG. 7 is an elevational view of the rearview mirror housing, the mirror having been removed to show the mechanism contained therein;

FIG. 8 is a sectional view taken along line VIII—VIII of FIG. 7;

FIG. 9 is a sectional view taken along line IX—IX of FIG. 7; and

FIG. 10 is a sectional view taken along line X—X of FIG. 7.

DETAILED DESCRIPTION OF THE PREFERRED EMBODIMENT

Figure 1:
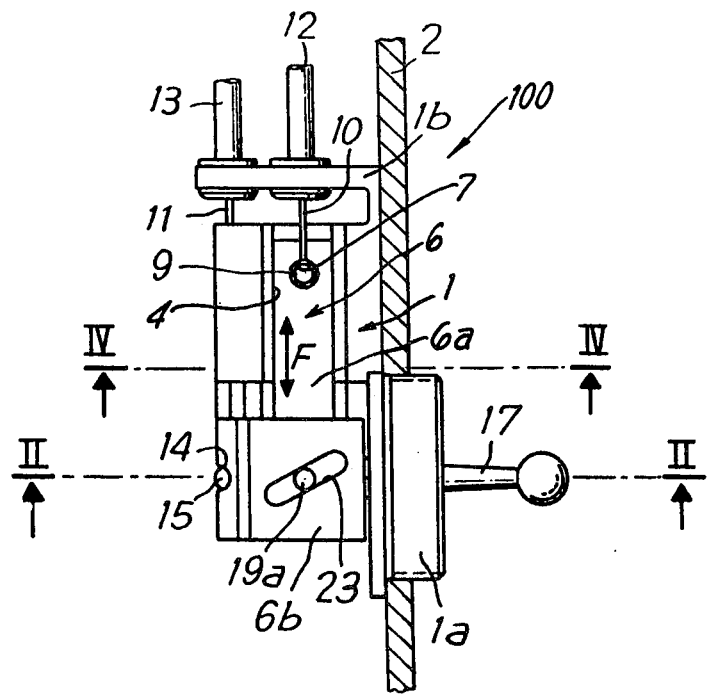
FIG. 1 is a side elevational view of an example of structure of a lever-type control device according to the present invention.

Referring now to the drawings, generally illustrating a remote control apparatus according to the present invention, FIGS. 1 through 5 show a rearview mirror control device 100 of the remote control apparatus which is connected by two transmission cables 10 and 11 to a mirror actuating device 101 of the remote control apparatus, illustrated in FIGS. 7 through 10. The control device 100 includes a support member 1 with a projecting portion 1a which is engaged in an orifice provided in a wall 2 inside the vehicles. The support member 1 is mounted to the wall 2 by any appropriate known means.

Figure 3:
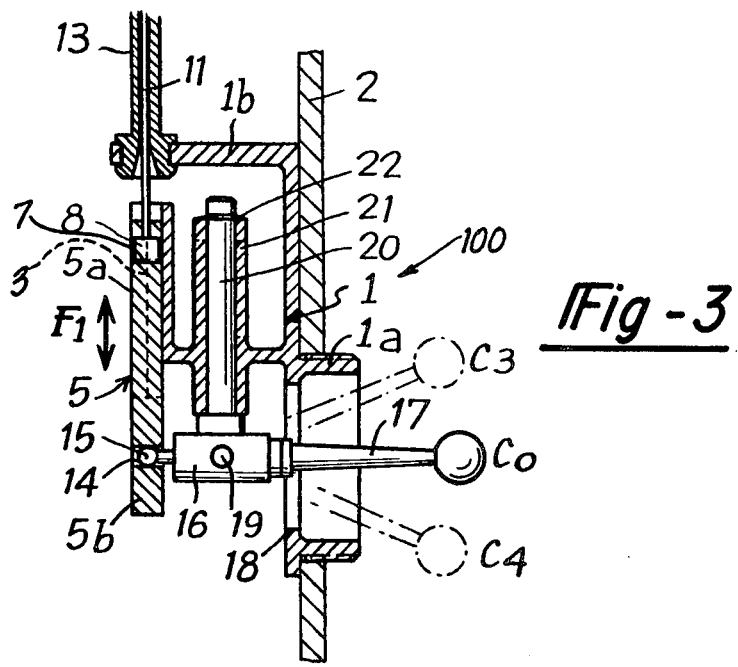
FIG. 3 is a sectional view, with parts removed, taken along line III—III of FIG. 2.
Figure 4:
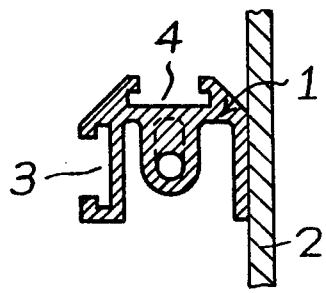
FIG. 4 is a sectional view, with parts removed, taken along line IV—IV of FIG. 1.
Figure 5:
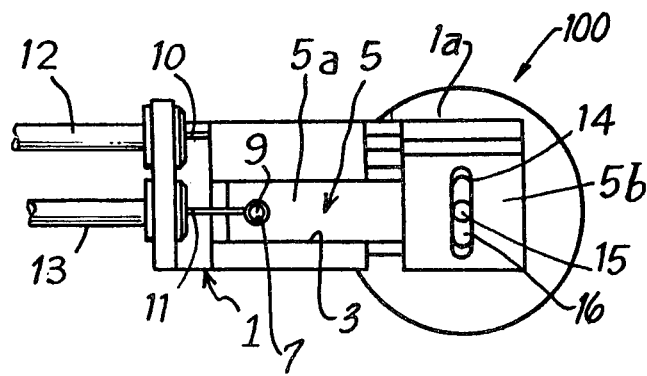
FIG. 5 is a rear elevational view of the control device, as viewed according to arrow V of FIG. 2.

The support member 1 is provided with two parallel grooves 3 and 4 which are located in two perpendicular planes, as best shown in FIG. 4. The transmission member 5 is mounted in a groove 3, as shown in FIGS. 3 and 5. A transmission member 6 is mounted in the groove 4 as shown in FIG. 1. Each of the transmission members 5 and 6 has a rectilinear portions 5a and 6a, respectively, as shown in FIGS. 1, 3, 5 and 6, mounted for sliding in the grooves 3 and 4. The portions 5a and 6a are provided at one of their ends with recesses 7 in which are engaged bosses 8 and 9, respectively secured on the ends of the transmission of control cables 10 and 11. The control cables 10 and 11 are slidably fitted in sheaths 12 and 13, respectively, one end of which is secured on a bracket 1b of the support member as best depicted in FIGS. 1 and 5.

Figure 2:
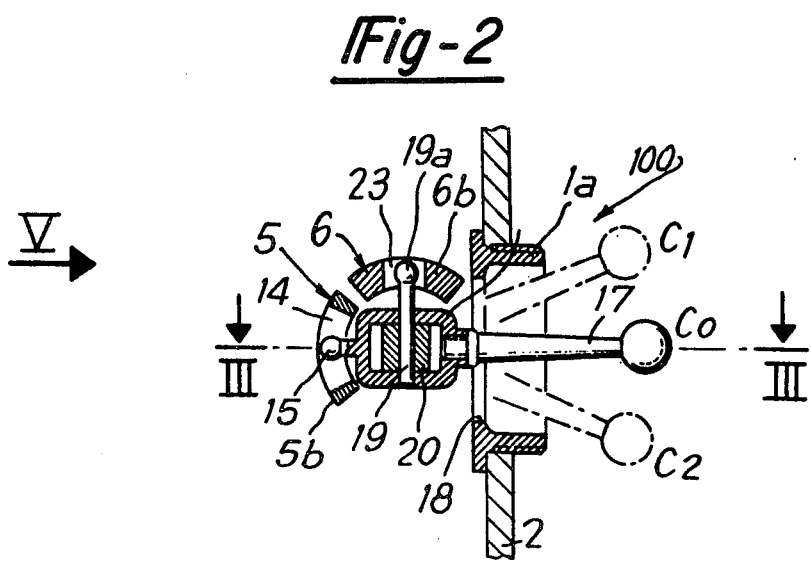
FIG. 2 is a sectional view taken along line II—II of FIG. 1.

The rectilinear portions 5a and 6a of the transmission members 5 and 6 are extended by rounded portions 5b and 6b, respectively, as shown in FIGS. 1, 2, 5 and 6. A slot 14 is provided in the rounded portion 5b of the transmission member 5, which slot is located in a plane perpendicular to the sliding axis of the transmission member 5. A spherically shaped finger 15 is formed integrally with a brace 16 and is engaged in the slot 14. A control lever 17 is interconnected with the brace 16 and extends therefrom through an orifice 18 provided in the projecting part 1a of the support member through the wall 2. The finger 15 is directed along the same axis as the lever 17. The brace 16 is pivotally mounted by way of a pivot pin 19, as shown in FIGS. 2 and 3 on the end of a stem 20 which in turn is rotatably mounted inside a bearing 21 formed integrally with the support member. The stem 20 is held in position by an elastic washer 22. The pivot pin 19 is disposed perpendicularly to the rotational axis of the stem 20.

The pivot pin 19 is extended by a spherical swell 19a, as depicted in FIG. 2 which is engaged in a slot 23 provided in the rounded portion 6b of the transmission member 6. The slot 23 is inclined with respect to a plane perpendicular to the sliding axis of the transmission members 5 and 6.

FIGS. 7 through 10 show a rearview mirror housing 24 and a mirror actuating device 101. A support member 26 is fitted, by way of a screw 25, to the inner surface of the housing 24. The support member 26 is extended at the front by a fork member 26a, best shown in FIGS. 7 through 9, which is provided with recesses in which pivots 27 and 27a of a crosspiece 28 are engaged. The crosspiece 28 also has pivots 29 and 29a, as shown in FIGS. 7 and 9, which are engaged in corresponding recesses provided in a fork 30 fitted on the rear face 31a of a mirror support 31 shown in FIGS. 8 and 9.

At the end opposite the pivots 27 and 27a, the crosspiece 28 includes a recess in which is engaged a boss 32 secured to the end of the cable as shown in FIG. 9. The sheath 13 of the cable 11 rests against an abutment 33 which is hingedly mounted, by way of pivots 34 and 34a, in recesses provided on the support member 26. Also provided on the support member 26 is a fork 35, shown in FIGS. 7 and 10. An elbow-shaped lever 37 is pivotally mounted betwen the shanks of the fork 35 for pivoting in the center and about a pin 36. One of the ends of lever 37 is provided with a hemispherical recess 37a. A finger 39 is provided at one end thereof with a knuckle head 38 engaged in the hemispherical recess 37a and at the other end thereof with a knuckle head 38a engaged in a recess 40 provided in the rear face 31a of the mirror support 31. The pivoting point of the finger 39 on the mirror support 31 is offset with respect to the horizontal pivoting axis defined by the pivot 29 and 29a of the mirror support 31 on the crosspiece.

At the other end of the lever 37, there is provided a recess in which is engaged a boss 41 attached to one end of the cable 10. The sheath 12 of the cable 10 rests against an abutment pivotally mounted to the support member 26 by way of pivots 43 and 43a in corresponding recesses provided on the support member 26.

The cables 10 and 11 can be constituted by rigid hardened steel wires of the piano-chord type, which are placed inside the sheaths 12 and 13 of plastic material reinforced with steel wires. It is also possible to use flexible cables of the type generally known under the name Bowden cables. In this latter case, however, it is necessary to provide elastic return means 44 first between the lever 37 and the support member 26, and elastic, return means 45 between the crosspiece and the housing 24. In this later case, it is preferable in order to overcome the return force of the elastic members to provide braking means at least on the hinged connection of the control lever 17 or on each one of the transmission members 5 and 6.

The device according to the invention operates as follows. When the lever 17 is actuated as illustrated in FIG. 2 in order to pass from the position $C_0$ to the positions $C_1$ or $C_2$, the stem 20 is caused to rotate inside the bearing 21 in such a way that the finger 15 moves inside the slot 14 without causing the transmission member 5 to move. On the other hand, the movement of the pivot pin 19 inside the inclined slot 23 causes the transmission member 6 to move in the direction of double arrow F in FIG. 1 inside the groove 4, as well as the movement of cable 10.

At its other end inside the housing 24, the cable 10 acts on the elbow-shaped lever 37 which pivots about the pin 36, thereby insuring, via the finger 39, the movement of the mirror-holder about the horizontal axis defined by the pivots 29 and 29a by an amount indicated by an angle $\beta$, and the consequent upward and downward movement of the mirror.

When the lever 17 is actuated, as shown in FIG. 3 in order to pass from the position $C_0$ to the positions $C_3$ or $C_4$, the stem 20 remains stationary and the lever 17 pivots about the pivot pin 19, so that the finger 15 engaged in the slot 14 drives the transmission member 5 into motion. The transmission member 5 slides in the groove 3 in the direction of double arrow $F_1$. The transmission member 5, by being interconnected with one of the ends of the cable 11, drives the latter to translate. At the other end of the cable 11 inside the housing 24, the cable 11 acts on the crosspiece 28, which pivots about the pivots 27 and 27a thereby insuring the movement of the mirror support 31 about a vertical axis as indicated by an angle $\alpha$ and thereby provides the left-right movement of the mirror.

The invention is in no way limited to the specific description given hereinabove. Modifications will be apparent to those skilled in the art which may be made thereto without departing from the spirit of the present invention or the intended scope of the claims appended hereto.

What is claimed as novel is as follows:

1. A remote control apparatus for pivotally positioning a rearview mirror in two coordinate positions, said remote control apparatus comprising:

mirror housing means;

a crosspiece pivotally mounted to said mirror housing means such as to pivot about a first preselected axis relative to said mirror housing means;

mirror means pivotally mounted to said crosspiece such as to pivot about a second preselected axis relative to said crosspiece, said second preselected axis being perpendicular to said first preselected axis;

a crosspiece portion disposed remote from said first preselected axis;

a first transmission cable having a first end interconnected with said crosspiece portion and a second end opposite said first end, said first end extending in a direction substantially parallel to said second preselected axis such that displacement of said first transmission cable causes said mirror means to pivot about said first preselected axis relative to said mirror housing means;

a lever having a first end, a second end opposite said first end, and an intermediate portion disposed between said first and second ends thereof, said lever being pivotally fastened to said mirror housing means at said intermediate portion such as to pivot about a third preselected axis disposed parallel to said first preselected axis;

a second transmission cable having a first end interconnected with said first end of said lever and a second end opposite said first end, and said first end of said second transmission cable extending in a direction generally parallel to said second preselected axis such that displacement of said second transmission cable causes said lever to pivot about said third preselected axis; and hinge means interconnecting said second end of said lever with said mirror means at a preselected location on said mirror means spaced away from said second preselected axis such that pivoting motion of said lever about said third preselected axis causes pivoting motion of said mirror means about said second preselected axis relative to said mirror housing means.

2. The remote control apparatus of claim 1 wherein said mirror housing means further comprises:

a mirror housing partially enclosing said crosspiece, said first transmission cable, said lever, and said second transmission cable such that said mirror housing cooperates with said mirror means to completely enclose said crosspiece, said first end of said first transmission cable, said lever, and said first end of said second transmission cable; and support means fixedly interconnected with said mirror housing and disposed therein, said crosspiece and said lever being pivotally interconnected with said support means.

3. The remote control apparatus of claim 1 wherein said mirror means further comprises:
   a mirror plate; and
   a mirror support, said mirror support being fixedly interconnected with said mirror plate, pivotally interconnected with said crosspiece, and hingedly interconnected with said hinge means.

4. The remote control apparatus of claim 1 further comprising:
   biasing means interposed between said crosspiece and said mirror housing means and biasing said crosspiece away from said second end of said first transmission cable.

5. The remote control apparatus of claim 1 further comprising:
   biasing means interposed said lever and said mirror housing means and biasing said lever in a direction away from said second end of said second transmission cable.

6. The remote control apparatus of claim 1 wherein said hinge means further comprises:
   a first socket means in said second end of said lever;
   second socket means formed in said mirror means at said preselected location; and
   knuckle joint means having a first end inserted in said first socket means and a second end opposite said first end inserted in said second socket means.

7. The remote control apparatus of claim 1 wherein said lever is elbow-shaped, such that said first end, said second end, and said intermediate portion thereof are not co-linear.

8. The remote control apparatus of claim 1 further comprising control means disposed remote from said mirror housing for selectively displacing said first and second transmission cables and, thereby, for selectively positioning said mirror means in two coordinate directions relative to said mirror housing means.

9. The remote control apparatus of claim 8 wherein said control means further comprises:
   support means;
   a first plate slidably mounted to said support means such as to slide relative to said support means along a fourth preselected axis, said second end of said first transmission cable being interconnected with said first plate for translation therewith;
   a second plate slidably mounted to said support means such as to slide relative to said support means along a fifth preselected axis disposed parallel to said fourth preselected axis, said second end of said second transmission cable being interconnected with said second plate for translation therewith;
   a first slot formed in said first plate, said first slot being disposed in a first preselected plane perpendicular with said fourth preselected axis, said first slot defining, through the sliding motion of said first plate relative to said support means, a second preselected plane perpendicular to said first preselected plane;
   a second slot formed in said second plate, said second slot being inclined relative to said first preselected plane and further being inclined relative to said fifth preselected axis, said second slot further defining, by the sliding motion of said second plate relative to said support means, a third preselected plane perpendicular to both of said first and second preselected planes;
   pivot means pivotally interconnected with said support means such as to universally pivot relative to said support means about a sixth preselected axis perpendicular to said third preselected plane and about a seventh preselected axis parallel to said fourth preselected axis, about a pivot point adjacent said first and second slots;
   pivot control means for selectively pivoting said pivot means on said pivot point about said sixth and seventh preselected axes;
   first slot engagement means extending from said pivot means into said first slot such that when said pivot control means causes said pivot means to pivot about said sixth preselected axis, said first slot engagement means causes displacement of said first plate relative to said support means without causing displacement of said second plate relative to said support means; and
   second slot engagement means extending from said pivot means into said second slot such that, when said pivot control means causes said pivot means to pivot about said seventh preselected axis, said second engagement means causes displacement of said second plate relative to said support means without displacing said first plate relative to said support means.

10. The remote control apparatus of claim 9 wherein said support means comprises a support member having first and second groove means, said first plate being slidably inserted in said first groove means an said second plate being slidably inserted in said second groove means.

11. The remote control apparatus of claim 10 wherein said pivot control means comprises a handle fixedly interconnected with said pivot means and extending therefrom for manual operation of said remote control apparatus.

12. The remote control apparatus of claim 9 wherein said pivot means further comprises:
   a first member rotatably interconnected with said support means such as to rotate about said seventh preselected axis; and
   a second member pivotally interconnected with said first member such as to pivot about said sixth preselected axis relative to said first member, said first and second slot engagement means extending from said second member.

13. The remote control apparatus of claim 9 wherein each of said first and second transmission cables further comprise a sheath having a first end and a second end, said first end being interconnected with said mirror housing means and said second end being interconnected with said support means.

14. A remote control apparatus for pivotally positioning a rearview mirror in two coordinate dimensions, said remote control apparatus comprising:
   mirror housing means;
   mirror means pivotally interconnected with said mirror housing means such as to universally pivot relative to said mirror housing means about a first preselected axis and a second preselected axis perpendicular to said first preselected axis;
   first pivot control means interposed said mirror means and said mirror housing means for selectively pivoting said mirror means relative to said mirror housing means about said first preselected axis;

second pivot control means interposed said mirror means and said mirror housing means for selectively pivoting said mirror means relative to said mirror housing means about said second preselected axis;

a first transmission cable having a first end interconnected with said first pivot control means and a second end opposite said first end, such that displacement of said first transmission cable actuates said first pivot control means to pivot said mirror means relative to said mirror housing means about said first preselected axis;

a second transmission cable having a first end interconnected with said second pivot control means and a second end opposite said first end, such that displacement of said second transmission cable actuates said second pivot control means to pivot said mirror means relative to said mirror housing means about said second preselected axis;

support means disposed remote from said mirror housing means;

a first plate slidably mounted to said support means such as to slide relative to said support means along a fourth preselected axis, said second end of said first transmission cable being interconnected with said first plate for translation therewith;

a second plate slidably mounted to said support means such as to slide relative to said support means along a fifth preselected axis disposed parallel to said fourth preselected axis, said second end of said second transmission cable being interconnected with said second plate for translation therewith;

a first slot formed in said first plate, said first slot being disposed in a first preselected plane perpendicular with said fourth preselected axis, said first slot defining, through the sliding motion of said first plate relative to said support means, a second preselected plane perpendicular to said first preselected plane;

a second slot formed in said second plate, said second slot being inclined relative to said first preselected plane and further being inclined relative to said fifth preselected axis, said second slot further defining, by the sliding motion of said second plate relative to said support means, a third preselected plane perpendicular to both of said first and second preselected planes;

pivot means pivotally interconnected with said support means such as to universally pivot relative to said support means about a sixth preselected axis perpendicular to said third preselected plane and about a seventh preselected axis parallel to said fourth preselected axis, about a pivot point adjacent said first and second slots;

handle means for selectively pivoting said pivot means on said pivot point about said sixth and seventh preselected axes;

first slot engagement means extending from said first pivot means into said first slot such that when said handle means causes said pivot means to pivot about said sixth preselected axis, said first slot engagement means causes displacement of said first plate relative to said support means without causing displacement of said second plate relative to said support means; and second slot engagement means extending from said pivot means into said second slot such that, when said handle means causes said pivot means to pivot about said seventh preselected axis, said second slot engagement means causes displacement of said second plate relative to said support means without displacing said first plate relative to said support means.

15. The remote control apparatus of claim 14 wherein said support means comprises a support member having first and second groove means, said first plate being slidably inserted in said first groove means and said second plate being slidably inserted in said second groove means.

16. The remote control apparatus of claim 14 wherein said pivot means further comprises:
   a first member rotatably interconnected with said support means such as to rotate about said seventh preselected axis; and
   a second member pivotally interconnected with said first member such as to pivot about said sixth preselected axis relative to said first member, said first and second slot engagement means extending from said second member.

17. The remote control apparatus of claim 14 wherein each of said first and second transmission cables further comprise a sheath having a first end and a second end, said first end being interconnected with said mirror housing means and said second end being interconnected with said support means.

18. A remote control apparatus for pivotally positioning a rearview mirror in two coordinate dimensions, said remote control apparatus comprising:
   a mirror housing;
   a support member fixedly interconnected with said mirror housing and disposed therein;
   a crosspiece pivotally mounted to said support member such as to pivot about a first preselected axis relative to said mirror housing;
   a mirror support pivotally mounted to said crosspiece such as to pivot about a second preselected axis relative to said crosspiece, said second preselected axis being perpendicular to said first preselected axis;
   a mirror plate fixedly interconnected with said mirror support, said mirror plate cooperating with said mirror housing to enclose said support member, said crosspiece and said mirror support;
   a crosspiece portion disposed remote from said first preselected axis;
   a first transmission cable having a first end interconnected with said crosspiece portion and a second end opposite said first end, said first end extending in a direction substantially parallel to said second preselected axis such that displacement of said first transmission cable causes said mirror support to pivot about said first preselected axis relative to said mirror housing;
   a lever having a first end, a second end opposite said first end, and an intermediate portion disposed between said first and second ends thereof, said lever being pivotally fastened to said support member at said intermediate portion such as to pivot about a third preselected axis disposed parallel to said first preselected axis;
   a second transmission cable having a first end interconnected with said first end of said lever and a second end opposite said first end, said first end of said second transmission cable extending in a direction generally parallel to said second preselected axis such that displacement of said second transmission cable causes said lever to pivot about said third preselected axis;

first socket means formed in said second end of said lever;

second socket means formed in said mirror support at a preselected location on said mirror support spaced away from said second preselected axis;

knuckle joint means having a first end inserted in said first socket means such as to be pivotable therein and a second end opposite said first end inserted in said second socket means such as to be pivotable therein, said knuckle joint means transferring pivoting motion of said lever about said third preselected axis to said mirror support such that pivoting motion of said lever about said third preselected axis causes pivoting motion of said mirror support about said second preselected axis relative to said mirror housing; and control means remote from said mirror housing for selectively displacing said first and second transmission cables.

19. The remote control apparatus of claim 18 wherein said control means further comprises:

support means;

a first plate slidably mounted to said support means such as to slide relative to said support means along a fourth preselected axis, said second end of said first transmission cable being interconnected with said first plate for translation therewith;

a second plate slidably mounted to said support means such as to slide relative to said support means along a fifth preselected axis disposed parallel to said fourth preselected axis, said second end of said second transmission cable being interconnected with said second plate for translation therewith;

a first slot formed in said first plate, said first slot being disposed in a first preselected plane perpendicular with said fourth preselected axis, said first slot defining, through the sliding motion of said first plate relative to said support means, a second preselected plane perpendicular to said first preselected plane;

a second slot formed in said second plate, said second slot being inclined relative to said first preselected plane and further being inclined relative to said fifth preselected axis, said second slot further defining, by the sliding motion of said second plate relative to said support means, a third preselected plane perpendicular to both of said first and second preselected planes;

pivot means pivotally interconnected with said support means such as to universally pivot relative to said support means about a sixth preselected axis perpendicular to said third preselected plane and about a seventh preselected axis parallel to said fourth preselected axis, about a pivot point adjacent said first and second slots;

pivot control means for selectively pivoting said pivot means on said pivot point about said sixth and seventh preselected axes;

first slot engagement means extending from said pivot means into said first slot such that when said pivot control means causes said pivot means to pivot about said sixth preselected axis, said first slot engagement means causes displacement of said first plate relative to said support means without causing displacement of said second plate relative to said support means; and second slot engagement means extending from said pivot means into said second slot such that, when said pivot control means causes said pivot means to pivot about said seventh preselected axis, said second slot engagement means causes displacement of said second plate relative to said support means without displacing said first plate relative to said support means.

* * * * *

UNITED STATES PATENT AND TRADEMARK OFFICE
CERTIFICATE OF CORRECTION

PATENT NO. : 4,475,414
DATED : October 9, 1984
INVENTOR(S) : Stephane Manzoni

It is certified that error appears in the above-identified patent and that said Letters Patent is hereby corrected as shown below:

Column 1, line 33, delete "cables the" and insert ---- cables. The ----.

Column 2, line 17, delete "vehicles" and insert ---- vehicle ----.

Column 2, line 31, delete "of" second occurrence, and insert ---- or ----.

Column 3, line 3, after the numeral "31" insert a comma ---- , ----.

Column 3, line 6, after "cable" insert ---- 11 ----.

Column 3, line 12, delete "betwen" and insert ---- between ----.

Column 3, line 35, delete "first".

Column 3, line 37, delete the comma ",".

Signed and Sealed this

Twenty-third Day of April 1985

[SEAL]

Attest:

DONALD J. QUIGG

Attesting Officer     Acting Commissioner of Patents and Trademarks